US008949525B2

(12) United States Patent
Niemela et al.

(10) Patent No.: US 8,949,525 B2
(45) Date of Patent: Feb. 3, 2015

(54) METHOD OF SETTING UP A REDISTRIBUTION SCHEME OF A DIGITAL STORAGE SYSTEM

(75) Inventors: Fredrik Niemela, Spanga (SE); Matthias deZalenski, Stockholm (SE); Gunnar Kreitz, Stockholm (SE); Tommie Gannert, Akersberga (SE); Peter Schuller, Kista (SE)

(73) Assignee: Spotify, AB (SE)

( * ) Notice: Subject to any disclaimer, the term of this patent is extended or adjusted under 35 U.S.C. 154(b) by 465 days.

(21) Appl. No.: 13/086,427

(22) Filed: Apr. 14, 2011

(65) Prior Publication Data
US 2011/0258383 A1   Oct. 20, 2011

Related U.S. Application Data (60) Provisional application No. 61/323,951, filed on Apr. 14, 2010.

(30) Foreign Application Priority Data

Apr. 14, 2010   (EP) ..................................... 10159919

(51) Int. Cl.
*G06F 12/08* (2006.01)
*G06F 17/30* (2006.01)

(52) U.S. Cl.
CPC ..................................... *G06F 17/303* (2013.01)
USPC ................... 711/114; 711/E12.019; 711/165; 711/E12.002; 707/807; 707/E17.005

(58) Field of Classification Search
CPC ............... G06F 3/0635; G06F 17/303; G06F 17/30575; G06F 21/6236; G06F 11/2064; G06F 11/2074; G06F 11/1456; G06F 11/1471; G06F 11/1451; G06F 11/2069; G06F 11/2094; G06F 17/30212; G06F 17/30194; G06F 17/30581; G06F 17/30628; G06F 17/30082; G06F 17/30097; G06F 3/067; G06F 3/065; G06F 3/0647; G06F 3/064; G06F 2201/82; G06F 12/0646

USPC .......... 711/165, 114, 162, 163, 170, E12.002, 711/E12.103, E12.019, 103, E12.001, 112, 711/173, 141, 154, 157, 164; 707/807, 707/E17.005, E17.032, 610, E17.007, 650, 707/673, E17.044, 640, 655, 667, 999.202; 717/177

See application file for complete search history.

(56) References Cited

U.S. PATENT DOCUMENTS 6,240,486 B1 *   5/2001   Ofek et al. ..................... 711/112
7,552,300 B2 *   6/2009   Man et al. ...................... 711/165

(Continued)

FOREIGN PATENT DOCUMENTS

WO   2008040092 A1   4/2008

OTHER PUBLICATIONS

European Patent Office, European Search Report for EP Patent Application No. EP 10159919.9, Jul. 13, 2010, 5 pages.

*Primary Examiner* — Yaima Rigol
*Assistant Examiner* — Edward Waddy, Jr.
(74) *Attorney, Agent, or Firm* — Meyer IP Law Group (57) ABSTRACT

A method of setting up a redistribution scheme for redistributing digital data packages within a digital data storage system comprising a plurality of nodes, wherein the data packages are associated with respective keys and are distributed among the nodes according to a first distribution configuration within the digital data storage system. The method includes: determining a second distribution configuration, in accordance with which it is intended to redistribute the data packages; applying a migration function to the respective keys of each of the data packages, which function yields a migration value associated with each of the data packages; and assigning a migration time to each of the data packages based on its associated migration value, at which times it is intended to migrate the respective data packages to conformity with the second distribution configuration. A corresponding digital data storage system is described.

20 Claims, 2 Drawing Sheets (56) References Cited

U.S. PATENT DOCUMENTS

| | | | |
|---|---|---|---|
| 8,281,100 B2* | 10/2012 | Yoshinari et al. | 711/165 |
| 2006/0101084 A1* | 5/2006 | Kishi et al. | 707/200 |
| 2007/0011422 A1* | 1/2007 | Srinivasan et al. | 711/165 |
| 2007/0208790 A1* | 9/2007 | Reuter et al. | 707/206 |
| 2007/0260840 A1* | 11/2007 | Watanabe | 711/165 |
| 2008/0025344 A1* | 1/2008 | Biederman et al. | 370/498 |
| 2008/0059746 A1* | 3/2008 | Fisher | 711/165 |
| 2008/0080473 A1* | 4/2008 | Thubert et al. | 370/348 |
| 2008/0270698 A1* | 10/2008 | Shirogane et al. | 711/114 |
| 2008/0288654 A1 | 11/2008 | Matuszewski et al. | |
| 2010/0020807 A1 | 1/2010 | Wang | |
| 2010/0061385 A1* | 3/2010 | Welin et al. | 370/401 |
| 2010/0228798 A1* | 9/2010 | Kodama et al. | 707/822 |
| 2011/0040729 A1* | 2/2011 | Ito et al. | 707/654 |
| 2012/0011338 A1* | 1/2012 | Kobayashi | 711/162 |

* cited by examiner

METHOD OF SETTING UP A REDISTRIBUTION SCHEME OF A DIGITAL STORAGE SYSTEM

This application claims the benefit of U.S. Provisional Application No. 61/323,951, filed 14 Apr. 2010, and European Patent Application No. 10159919.9, filed 14 Apr. 2010, both of which are incorporated herein by reference in their entirety.

BACKGROUND

The present invention relates to a method of setting up a redistribution scheme for redistributing digital data packages within a digital data storage system comprising a plurality of nodes, as well as to a digital data storage system comprising a plurality of nodes.

When storing large amounts of data in a storage system, it may be convenient to do so over a plurality of nodes, since it may not be practical to store all the data in only one node. Using a plurality of nodes may also make the storage system more flexible. A typical storage system using a plurality of nodes is a Distributed Hash Table (DHT) which is made up of a plurality of linked servers. Occasionally it may be desired to redistribute the data of stored in the storage system. There may be many different reasons for redistributing the data, such as if the load (e.g., requests for data) on some nodes is generally higher or closer to their maximum capacity than on other nodes, or if nodes are added to, moved within or removed from the system. A typical way of performing the redistribution of data within the storage system is to cut off client access to the storage system during a transition time when the data is migrated from the old configuration to the new configuration, performing the migration as quickly as possible to keep down the transition time and allowing access to the storage system again as soon as possible.

SUMMARY

According to an aspect of the present invention there is provided a method of setting up a redistribution scheme for redistributing digital data packages within a digital data storage system comprising a plurality of nodes, wherein the data packages are associated with respective keys and are distributed among the nodes according to a first distribution configuration within the digital data storage system, the method comprising: determining a second distribution configuration, in accordance with which it is intended to redistribute the data packages; applying a migration function to the respective keys of each of the data packages, which function yields a migration value associated with each of the data packages; and assigning a migration time to each of a plurality of the data packages based on its associated migration value, at which times it is intended to migrate the respective data packages to conformity with the second distribution configuration.

It may be convenient to perform the steps of the method in the order in which they are recited above, but it may in some cases be convenient to perform the steps in a different order. For instance, the determining of a second distribution configuration may very well be performed simultaneously with or after the applying of the migration function, or simultaneously with or after the assigning of migration times.

By applying a migration function to the keys, yielding migration values on which migration times associated with the respective data packages are based, the migration function is used to, at least indirectly, determine when, and consequently in which order, each of the respective data packages should be migrated. Thus, e.g., consecutive data packages stored in a node of the storage system need not be migrated consecutively. Instead, a different migration order of the data packages may be used based on the migration function. This enables avoiding high migration loads on specific nodes during certain time ranges during the redistribution. Instead, the migration load may be spread out over the different nodes and over time depending on the migration function used, keeping down the migration load on individual nodes at any given time.

According to another aspect of the present invention, there is provided a digital data storage system comprising a plurality of nodes, wherein data packages are associated with respective keys and are distributed among the nodes according to a first distribution configuration within the digital data storage system, the storage system being adapted to redistribute the digital data packages to conformity with a second distribution configuration within the storage system by migrating the data packages at respective migration times assigned to the data packages based on respective migration values associated with the data packages by applying a migration function to the respective keys of each of the data packages.

The discussion above and below relating to the method is in applicable parts also relevant to the system.

BRIEF DESCRIPTION OF THE DRAWINGS

Referring now to the figures, which are exemplary embodiments.

DETAILED DESCRIPTION

The digital data packages may be any digital data packages that may be stored in a digital data storage system, such as e.g., key/value pairs of a hash table or only copies of the respective keys.

The keys may be any keys that may be associated with respective data packages. Typically, a client or corresponding entity may request access to a specific data package by sending a request including the key of the data package to the storage system whereby the storage system may look up the data package. A copy of each of the keys may conveniently be stored in the storage system, e.g., together with respective data packages, possibly forming a part of said data packages, or in some other place in the storage system, conveniently pointing towards their respective data packages.

The digital data storage system may be any system able to store digital data packages in a plurality of nodes. The digital storage system may e.g., be a Distributed Hash Table (DHT), or a Redundant Array of Independent Disks (RAID) or Just a Bunch of Disks (JBOD), or any other storage system where a plurality of data packages may be stored among a plurality of nodes.

The nodes may be individual servers, e.g., of a DHT, or disks, e.g., of a RAID, or any other type of storage or computation nodes with or without their own respective processors.

There may be many different reasons for redistributing the data packages of a multi-node storage system, such as if the load (e.g., requests for data packages) on some nodes is generally higher or closer to their maximum capacity than on other nodes, or if nodes are added to, moved within or removed from the system, changing the node configuration of the storage system. Thus, the first distribution configuration may be associated with a first node configuration, and the second distribution configuration may be associated with a second node configuration which is different from the first node configuration.

The storage system may be geographically widespread, e.g., comprising nodes in several different regions or countries, or even on different continents. Thus, the nodes may be geographically dispersed over a plurality of continents. This may be convenient since data packages often requested in one geographical region but not in other regions may e.g., be stored in a node in or close to that region. The number of requests for a specific data package from different geographical regions may also be a reason to migrate the data package within the storage system to a node of a different region, and this may be yet another reason for redistributing the data packages of the storage system.

The data packages may be stored in a table, such as a hash table or other look-up table, distributed over the nodes of the storage system such that each of the keys may be mapped to its corresponding data package by applying a mapping function to said key. In the case of a hash table, the mapping function is a hash function, and the data packages are stored in different slots of the table based on the hash value obtained when applying the hash function to the respective keys of the data packages. When redistributing data packages within the storage system, wherein the data packages are stored in a table distributed over the nodes of the storage system, the data packages may be migrated to new physical locations within the storage system but the positions of the data packages within the table may remain the same, i.e. the mapping function of the table may be the same before and after the migration. It is contemplated to use the mapping function also as the migration function, but this maybe undesirable since data packages stored consecutively in a node may, depending on the configuration of the storage system, also then be migrated consecutively, leading to a temporarily high migration load on that particular node. It may thus be convenient to use a migration function which is different than the mapping function, allowing data packages to be migrated in an order which is different from the order in which they are stored in the nodes and/or different from the order in which they are stored in the table.

The migration function may be any function that may yield a value associated with a data package on which the assigning of a migration time to that data package may be based. The function might e.g., be a random number generator, yielding a random number (migration value) for each of the data packages to be migrated, determining the order in which the data packages should be migrated. This could evenly spread out the migration load over the nodes involved in the migration since the randomness will likely make sure that not all, or many, of the data packages to be migrated to or from a specific node are migrated close together in time, keeping down the migration load of that node.

However, it may be convenient to use a hash function as the migration function. A hash function may also spread out the migration load over the different nodes in a similar way as a random number generator, but has the added advantage of facilitating locating data packages during the redistributing of the data packages, i.e. during the transition from the first distribution configuration to the second distribution configuration. If a hash function is used as the migration function, the migration function may be applied to the key of a data package that it is desired to look up, whereby the migration value and migration time of that data package is obtained and it may be determined whether the data package has been moved or not, i.e. whether to use the first distribution configuration or the second distribution configuration for looking up the data package. This advantage with using a hash function is more pronounced when the transition from the first distribution configuration to the second distribution configuration is performed during a long time, such as days or even weeks.

Thus, the inventive method may further comprise: looking up one of the data packages by: applying the migration function to the key of said data package; determining from the redistribution scheme whether the migration time assigned to said data package is in the past or in the future; and using the first distribution configuration for lookup, provided that the migration time is determined to be in the future, or using the second distribution configuration for lookup, provided that the migration time is determined to be in the past.

The migration value yielded by the migration function, e.g., a hash function, may be only dependent on the key (also known as identifier) of a data package. This implies that if more than one transition is performed, e.g., a second transition from the second distribution configuration to a third distribution configuration, the data packages will be moved in the same order in all the transitions, of course allowing for data packages to be added to or removed from the storage system during or between the transitions. This may have some advantages. For instance, if the redistribution is due to the adding of a new node to the system and it is during the transition realised that the node is somehow inappropriate and should be removed or replaced, a new transition may be initiated to revert back to the first distribution configuration or to a third distribution configuration. If the migration value yielded is only dependent on the key, the data packages should, according to the scheme, be migrated in the same order as during the first, aborted, transition whereby the data packages already migrated to the inappropriate node should be the first to be migrated again and thus removed from the node which is then emptied and may be removed from the system.

Alternatively, the migration value of a data package yielded by the migration function may be dependent on both the key of the data package and on a parameter that is unique for each transition, e.g., the real starting time of the transition. In some cases this may be advantageous. If for instance a first transition is due to the adding of one or more nodes to the system and it is after or during the transition realised that the chosen target configuration, the second distribution configuration, is not ideal, but a transition to a new target configuration, a third distribution configuration, should be performed, it may be advantageous to use a different migration function for the second transition than for the first transition, since the migration load on the new node may be unnecessary high when the data packages migrated to the node during the first transition are again first to be moved during the second transition.

Typically, each data package will be associated with a unique migration value, but it is also contemplated that data packages may be allowed to be associated with identical migration values, in which case the data packages may be scheduled to migrated simultaneously or consecutively, or if this leads to a conflict it may be resolved in some other way.

The migration value may conveniently be used to directly set the order in which the data packages should be migrated, e.g., the data package associated with the lowest migration value may be assigned the earliest migration time and the data package associated with the highest migration value may be assigned the latest migration time, or vice versa. Thus, the migration values may set the order in which the data packages should be migrated according to the scheme, and the migration times may be assigned accordingly.

The assigned migration times may be real times, i.e. specifying the exact times of day, in e.g., hours and minutes of a certain day, when the migration of each of the data packages should be performed.

Alternatively, the migration times may be dependent on a counter, e.g., a migration time may correspond to an output of a counter. A possible advantage with using a counter instead of real time is that the counter may be controlled, e.g., speeded up, slowed down or stopped. The speed with which the counter is incremented may be controlled e.g., automatically by the storage system or manually by a human operator. Thus, if a counter is used, the counter may e.g., be slowed down or stopped during times when the load on the storage system is generally high, e.g., during the day or evening times in a geographical region that uses the storage system the most, and then be speeded up when the general load, exempting the migration load, on the system is lower. In this way, fewer or no data packages may be migrated during high general load on the system, e.g., load from requests put to the system from clients connected to the system, and the migration load may be allowed to be higher when the load from client requests is lower. A single counter may be used, e.g., synchronised over the plurality of nodes by known technique. It is also conceivable to use a plurality of different counters, e.g., associated with different parts of the storage system located in different geographical regions where the real peak load times may be differ between the regions.

Thus, a migration time may be real-time, i.e. a time of day, or the output of a controllable counter.

The migration times may be regarded as migration occasions, to ensure that they are not confused with real-time migration times.

As discussed above, it may be convenient to keep down the migration load on the system during the transition from the first distribution configuration to the second distribution configuration. This may be achieved, in accordance with the redistribution scheme, by spreading the data package migrations essentially evenly over the nodes and over time, or spreading the migrations in view of the other loads put on the system, e.g., with the help of a counter as discussed above. An advantage with this is that the function of the storage system is not impaired so much as would otherwise be the case. It may e.g., not be acceptable to shut down the access to the storage system for a long time during the transition. Advantageously, the storage system should be fully accessible during the transition and clients should not experience much delays in accessing data from the storage system due to the transition.

The transition from the first distribution configuration to the second distribution configuration may, in accordance with the redistribution scheme, be performed over a relatively long time period in order to keep down the migration load on the system to allow the system to function and be accessible during the transition. The transition may be performed during more than 24 hours, such as more than 48 hours, more than one week or more than two weeks.

Above, the setting up of the redistribution scheme has been discussed below will now be discussed how the actual migration of data packages of the first distribution configuration to conformity with the second distribution configuration may be performed.

The inventive method may further comprise migrating a plurality of the data packages distributed according to the first distribution configuration to conformity with the second distribution configuration based on their respective assigned migration times.

The assigned migration times may not be the actual times when the data packages are migrated. Rather, the migration times may indicate when the data packages should be moved, i.e. when the first or second distribution configurations should primarily be used to look up a specific data package in the storage system. Different strategies may be used for the actual migration of the data packages.

According to one possible migration strategy, each node in the storage system may loop over its own keys and copy the data packages to their new destinations in accordance with how the configuration should look sometime in the future. Thus, during a transitional period, a data package that is migrated is present both in its old position and in its new position. This may facilitate finding the data package during the transition. At the time a client begins to look for a data package in accordance with the second distribution configuration, it will already be present there. This strategy may be particularly advantageous if the data package, or the entire storage system, is read-only, at least during the transition, i.e. the data package cannot not be changed during the transition. If the data package cannot be changed during the transition, it may be no problem that the package exists in two or more copies during a transitional period. Thus, a plurality of the data packages distributed according to the first distribution configuration may be migrated such that they are each copied, and the copies are each migrated in accordance with the second distribution configuration before or at the migration time assigned to the respective data packages, allowing each of the migrated data package copies to coexist with its corresponding data package of the first distribution configuration during a transitional period before the data package of the first distribution configuration is deleted.

According to another possible migration strategy, data packages may not be allowed to exist in multiple copies, not even during a transitional period. Rather, each node of the storage system may loop over its own keys, and if it observes that it stores a data package that according to the redistribution scheme should already have migrated, it will push the data package to the node in which it should be stored according to the second distribution configuration. If a client contacts a node, requesting access to a data package that according to the redistribution scheme should have been migrated to this node by this time but the node determines that it still does not have the requested data package, the node may contact the node that according to the first distribution configuration stores the data package and request the data package to be migrated. This strategy may be particularly advantageous when the data package may be changed during the transition, e.g., if the data package, or the whole storage system, is read-write.

Of course, other strategies for migration may alternatively or additionally be used, or a combination of strategies.

Figure 1:
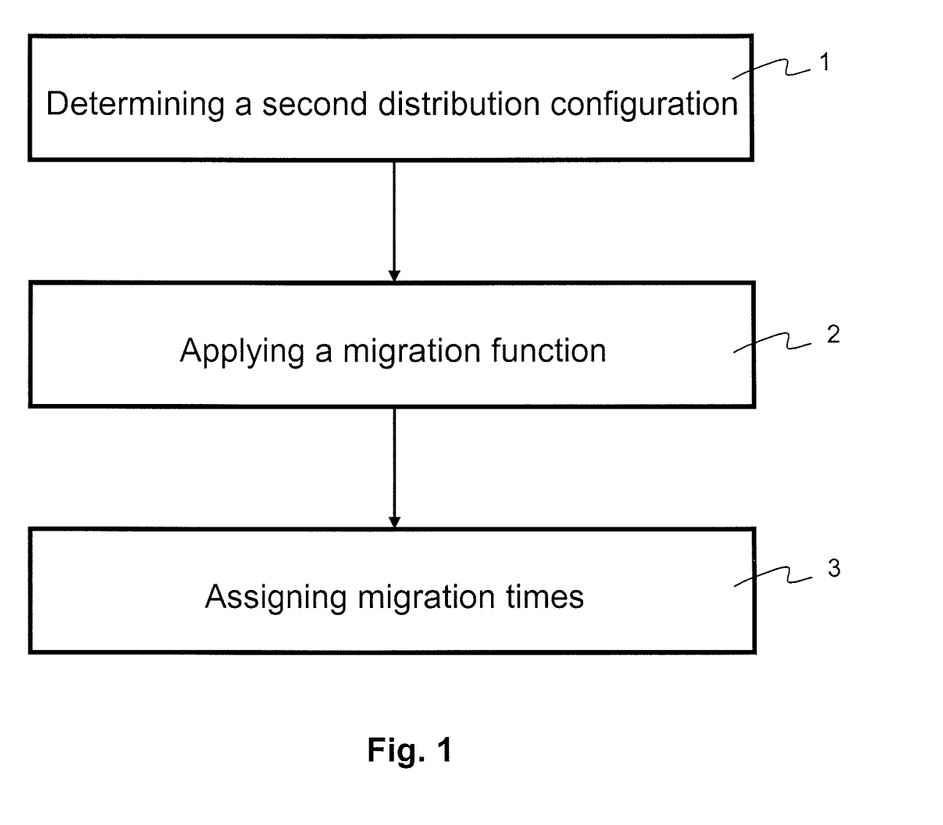
FIG. 1 is a process flow chart illustrating steps of a method in accordance with an embodiment of the present invention.

With reference to the FIGS. 1 and 2, a method according to an embodiment of the present invention will now be discussed.

In a digital data storage system 4 comprising a plurality of nodes 5 wherein data packages 6 associated with respective keys 7 are distributed among the nodes 5 according to a first distribution configuration within the digital storage system, a second distribution configuration is determined, step 1, in accordance with which second distribution configuration it is intended to redistribute the data packages 6 among the nodes 5 within the system 4. Thereafter, a migration function is applied, step 2, to the respective keys 7 of each of the digital data packages 6. The function yields a migration value for each of the digital data packages 6. If the migration function is a hash function, the migration value might conventionally be called a hash value or hash. A purpose of the migration value is to determine in which order the digital data packages 6 should be migrated. Based on their migration values, migration times are assigned, step 3, to each of the digital data packages 6. As discussed above, the migration times may be real time, or e.g., be based on a counter which gives a fictive and affectable time not necessarily directly dependent on the real time. The migration time is the time when it is intended to, according to the redistribution scheme, migrate a specific data package 6 to its dedicated position according to the second distribution configuration. It is not necessarily the actual time when the data package 6 is migrated, if it is at all migrated.

Figure 2:
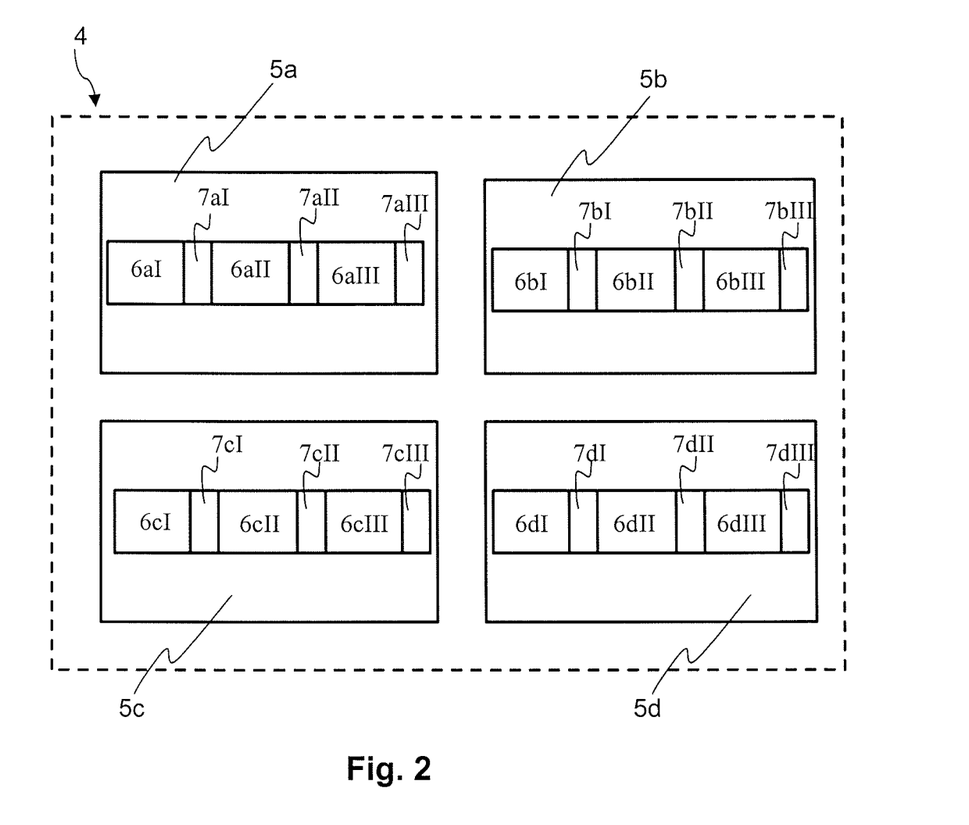
FIG. 2 is a schematic diagram illustrating a system in accordance with an embodiment of the present invention.

With reference to FIG. 2, a system in accordance with an embodiment of the present invention will now be discussed.

The digital storage system 4 comprises a plurality of nodes 5, here illustrated by the four nodes 5*a*-5*d* but any number of nodes may be comprised in the system 4. The nodes 4 may communicate with each other, or each node 4 may communicate with at least one other node 4, possibly via an other entity, in order to facilitate lookup and redistribution within the system 4. A plurality of digital data packages 6 are distributed among the nodes 5 such that each data package 6 is stored in a specific node 5 which is dedicated to storing that data package 6. In the figure, the data packages 6 are illustrated by the data packages 6*a*I-III stored in node 5*a*, 6*b*I-III stored in node 5*b*, 6*c*I-III stored in node 5*c*, and 6*d*I-III stored in node 5*d*. However, typically each node 5 may store many more, such as thousands or millions or more of data packages 6. Each data package 6, is associated with a key 7 specific for that data package 6. In the figure, the keys 7 are illustrated by the data packages 7*a*I-III stored in node 5*a*, 7*b*I-III stored in node 5*b*, 7*c*I-III stored in node 5*c*, and 7*d*I-III stored in node 5*d*. The number of keys 7 corresponds to the number of data packages 6, each data package 6 being associated with one specific key. In the embodiment of the figure, the keys 7 are stored in the nodes 5 adjacent to their respective associated data packages 6, but other possibilities for storing the keys 7 are also contemplated.

EXAMPLES

Example 1

A company is hosting a service where users can collaboratively work on text documents in real-time. Every time a user creates a new document, a random key for that document is generated. To ensure scalability, ten servers are involved in hosting the documents accessed by clients.

Each document is stored on a single server, and a client makes a request to the server specifying the key of the document it wants to access and update. A Distributed Hash Table is used to distribute the documents over the servers. The company now wishes to add five new servers to its server farm. They wish to start using these new servers without disrupting the current service.

Thus, there is an existing layout (i.e. distribution configuration) of the DHT (the details of which depend on the DHT scheme used). Using the present invention, the company creates a new DHT configuration, distributing the key space of the DHT over the 15 servers now involved. They then specify a transition period ranging over a week. A client trying to locate a document will then apply a hash function H (different from the hash functions used in the DHT) to the key of the document to determine which DHT configuration to use to look up the document. For simplicity of notation, we assume that the hash function hashes to a time uniformly within the interval. A person skilled in the arts appreciates that this can easily be accomplished with a normal hash function (which often has output uniform over the interval [0,2X-1] for some suitable x, e.g., 64).

The client computes the hash of the key of the document D, which we denote H(D.key). If H(D.key) is in the past, that indicates that the document should already have been migrated to its position according to the new distribution configuration. It will then send its request to the server which should be hosting it according to the target DHT configuration. As access to the documents is read-write, the company uses an embodiment of the invention adapted to such scenarios, i.e. not allowing multiple changeable copies of the document to coexist. Thus, it is possible that the server which the client contacts does not yet have the document, as migration in that embodiment is lazy. If a server gets a request for a document it does not have, the server will itself also compute the hash of the key of the document, and see if it is in the past or in the future. Assuming it was in the past, the server would then contact the server which is hosting the document according to the old DHT configuration and request for the document to be migrated to itself. Once that move is completed, the client's request is serviced.

Upon a request to the system, for a document with key K, the client (or frontend server) will perform the following:

```
if H(K) is in the past:
    send the request to the server responsible for K under the new DHT
else:
    send the request to the server responsible for K under the old DHT
```

Upon receiving a query for a document D, with key K, a server S, will perform the following:

```
if the server has the document with key K:
    serve the request
else:
    if H(K) is in the past:
        look up the server S' which is responsible for D under the new
            DHT configuration
        if S = S':
            look up the server S" which was responsible for D under
                the old DHT configuration
            request the document D with key K from S", asking S" to
                remove it.
            store D in local storage
            serve the request
        else:
            forward the request to S'
    else:
        look up the server S' which was responsible for D under the old
            DHT configuration
        if S = S':
            return "Document does not exist"
        else:
            forward the request to S'
```

Once the transitions has started, the following process will be performed by each server S:

```
while a transition is ongoing:
    for each document D stored at S:
        if H(D.key) is in the past:
            look up the server S' which is responsible for D under the
                new DHT configuration
```

-continued

```
If S' is different from S, then:
    transfer document D to server S'
    remove document D from local storage
```

Example 2

A common scenario is for a single server to have a large amount of hard disk drives connected to it. These disks can be connected to the server and configured in various ways, for instance as RAID or JBOD. We refer to such a server as a disk server. The invention has applications with regards to disk servers e.g., when it comes to addition, or removal of disks, or with regards to rebalancing the load on various disks.

Consider a busy web server hosting a large archive of files. In an attempt to spread the load onto all connected hard disk drives evenly, the server applies a DHT-like scheme (which, for simplicity, is referred to as a DHT), where the server hashes the key of the requested document to determine which disk the document should be located on. For redundancy, in this scheme, each document is stored on three different hard disk drives (indicated by the DHT), and read accesses randomly select one of the three candidates.

Imagine now that the company running the service determines that, due to a missconfiguration of the DHT, the load has not been evenly spread, and that some hard disk drives are overloaded, while some have read and write capacity to spare. Based on the access logs to the web server, the company creates a new DHT configuration which would spread the load better over the disks. However, the downtime to perform a naive transition to this scheme would be unacceptable.

Thus, the company applies the invention to perform the transition from the old to the new configuration. In this case, the access pattern is read-only, why a read-only strategy, as discussed above, is applied. A difference from the more common scenario with servers is that in this scenario, each node within the DHT does not have independent processing power (as it is only a hard disk drive). However, independent processing power can be easily emulated by the server by the application of well-known parallelization techniques, such as threads or processes. For simplicity, we will describe these as threads, but this should not be taken as a limitation of the generality. Thus, the server will create one, or more, thread per hard disk, and the actions described as being performed by a node/server is performed by the disk's thread.

Upon receiving a read request for the document with key K, the server performs the following:

```
Compute H(K)
    if H(K) is in the past:
        locate K using the new DHT configuration and service the
        request
    else:
        locate K using the old DHT configuration and service the
        request
```

The process/thread associated with a disk S performs the following:

```
while a transition is ongoing:
    for each document D stored at S:
        if H(D.key) is within X hours into the future of now:
            look up the disk S' which is responsible for D under the
            new DHT configuration
```

-continued

```
If S' is different from S, then:
    transfer document D to server S'
else if H(D.key) is in the past:
    remove document D from local storage
``` where X is configurable and should be set based on how fast disks can traverse their contents (with some safety margins)

Example 3

Consider again the scenario described in Example 1. It is possible that the company realizes three days into the week long transfer, that the load is increasing faster than they had first anticipated. Because of this they want to add another five servers to the server farm. The naive way of doing this would be to either spend three days reverting the transfers done so far (we do not want to move the documents faster for the same reason that we did not want to do the original transfer faster), or to wait four days for the original transfer to finish. Based on this observation, it could be useful to start transitioning to yet a new DHT configuration from any point in a transfer between two other DHT configurations.

Example 1 is extended to describe such a scenario. Using the present invention the company will now create yet a new DHT configuration (let us call it the "third DHT" and the previously existing "old DHT" and "new DHT" the "first DHT" and "second DHT", respectively) distributing the key space of the third DHT over the now 20 servers involved. We will denote the start time of the new transition (which is also the stop time of the old transition) as T.

A client trying to locate a document with key K, will then apply a hash function H2 (different from the hash function used in the DHT and the hash function H described in Example 1) to determine whether to use the third DHT configuration in the same way that is described in Example 1. If it is found that the new layout should not be used, the hash function H will be applied to determine whether to use the first or the second DHT. If H(K) is before T, the second DHT will be used otherwise the first DHT will be used.

Upon a request to the system, for a document with key K, the client (or frontend server) will perform the following:

```
if H2(K) is in the past:
    send the request to the server responsible for K under the third DHT
else:
    if H(K) is before T:
        send the request to the server responsible for K under the second
        DHT
    else
        send the request to the server responsible for K under the first
        DHT
```

This may be generalized to any number of interrupted transfers

Example 4

Consider again the scenario described in Example 2. In many services, it is the case that load varies throughout the day. For instance, a service servicing users primarily located in Western Europe generally sees very little traffic during night-time in Western Europe. Based on that observation, it can be beneficial for the service to perform the transition more aggressively during off hours, and perhaps pause it entirely during peak hours.

Example 2 is extended to describe such a scenario. The difference now is that the server maintains a monotonically increasing counter, which is not based on the clock (i.e. the real time, or the time of day) throughout the transition. This counter, denoted C, begins at 0, and will increase to some maximum value M. The hash is now assumed, for simplicity of notation, to hash onto [0,M].

When the server determines that it is under too heavy load to perform migration, it will pause all the threads involved in the migration and stop incrementing the counter.

When the server finds it has sufficient resources available to migrate, it will increment the counter and allow the threads to progress at a pace determined by the amount of resources available for migration. One way to do that, chosen in this scenario, is to increment the counter when every thread has inspected 1000 documents.

When receiving read requests, the server performs in the same way as in Example 2, with real time replaced by the counter.

A thread S performing migration would in this scenario:

```
while a transition is ongoing:
    for each document D stored at S:
        counter ← counter + 1
        if counter = 1000:
            pause, synchronizing with all threads (*)
            counter ← 0
        if H(D.key) ≤ C + X:
            look up the disk S' which is responsible for D under the
                new DHT configuration
            If S' is different from S, then:
                transfer document D to server S'
        else if H(D.key) < C:
            remove document D from local storage
``` where X is configurable and should be set based on how many documents are stored on the disks.

The step above indicated with an asterisk (*) may be accomplished using some well-known synchronization primitive, such as a semaphore, a thread reaching this statement will wait for all threads to reach the corresponding statement. When all threads have reached the statement, the server will increment the counter C by 1, and signal for all threads to continue their execution While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of setting up a redistribution scheme for redistributing digital data packages within a digital data storage system comprising
   providing, at a plurality of nodes, a plurality of data packages,
      wherein each data package is associated with a respective key that identifies its associated data package, and
      wherein the plurality of data packages are originally distributed among the nodes according to a first distribution configuration;
   determining a second distribution configuration, in accordance with which second distribution configuration the plurality of data packages are to be redistributed, during a transition period, among the plurality of nodes;
   applying a migration function to the respective keys of each of the plurality of data packages, to determine, for each data package, a migration value associated with that data package; and
   assigning, to each of the plurality of data packages, a migration time within the transition period, based on its associated migration value, at which times the respective data packages are to be migrated within those of the plurality of nodes indicated by the second distribution configuration, to be in conformity with the second distribution configuration, so that,
      upon receiving a request for a particular data package
         the key of the requested data package is used to determine the migration time for the particular data package,
         the particular data package's migration time is used to determine which of the first or the second distribution configurations should be used to locate the particular data package, and
         the request is one of processed at a node receiving the request, or forwarded to another of the nodes, based on the determined distribution configuration and the location of the particular data package within the plurality of nodes.

2. The method of claim 1 wherein the migration values set the order in which the data packages should be migrated according to the scheme, and the migration times are assigned accordingly.

3. The method of claim 2 wherein the data packages are stored in a table distributed over the nodes of the storage system such that each of the keys can be mapped to its corresponding data package by applying a mapping function to said key;
   wherein the mapping function is different than the migration function.

4. The method of claim 3 wherein the order in which the data packages should be migrated according to the scheme is different from the order in which the data packages are stored in the table distributed over the nodes of the storage system.

5. The method of claim 2 wherein the order in which the data packages should be migrated according to the scheme is different from the order in which the data packages are stored in a table distributed over the nodes of the storage system.

6. The method of claim 1 wherein the order in which the data packages should be migrated according to the scheme is different from the order in which the data packages are stored in a table distributed over the nodes of the storage system.

7. The method of claim 1 wherein the storage system is a Distributed Hash Table (DHT).

8. The method of claim 1 wherein the nodes are geographically dispersed over a plurality of continents.

9. The method of claim 1 wherein the storage system is a Redundant Array of Independent Disks (RAID) or Just a Bunch of Disks (JBOD).

10. The method of claim 1 wherein the migration time is one of
    a time of day, or
    an output of a controllable counter.

11. The method of claim 1 wherein the migration function is a hash function.

12. The method of claim 1 wherein the first distribution configuration is associated with a first node configuration, and the second distribution configuration is associated with a second node configuration which is different from the first node configuration.

13. The method of claim 1 further comprising migrating a plurality of the data packages, distributed according to the first distribution configuration, to conformity with the second distribution configuration based on their respective assigned migration times.

14. The method of claim 13 wherein the plurality of the data packages distributed according to the first distribution configuration are migrated such that they are each copied, and the copies are each migrated in accordance with the second distribution configuration before or at the migration time assigned to the respective data packages;
  wherein each of the migrated data package copies are allowed to coexist with its corresponding data package of the first distribution configuration during a transitional period before the data package of the first distribution configuration is deleted.

15. The method of claim 1 further comprising looking up one of the data packages by:
  applying the migration function to the key of said data package;
  determining from the redistribution scheme whether the migration time assigned to said data package is in the past or in the future; and
  in response to determining that the migration time assigned to said data package is in the future, using the first distribution configuration for lookup;
  in response to determining that the migration time assigned to said data package is in the past, using the second distribution configuration for lookup.

16. The method of claim 1 wherein the migration function is dependent on a starting time of the migration according to the redistribution scheme.

17. The method of claim 1 wherein the data packages are stored in a table distributed over the nodes of the storage system such that each of the keys can be mapped to its corresponding data package by applying a mapping function to said key;
  wherein the mapping function is different than the migration function.

18. The method of claim 1, wherein the second distribution configuration includes one or more additional nodes in addition to those nodes indicated by the first distribution configuration, and wherein, during the transition period, the respective data packages are migrated within those nodes represented by the second distribution configuration including the one or more additional nodes.

19. The method of claim 1, further comprising applying the migration function to the respective keys of the plurality of data packages, to distribute those data packages according to the second distribution configuration, including within one or more additional nodes, to accommodate changes in the nodes and load balancing of requests for those data packages.

20. A digital data storage system comprising:
  a plurality of nodes;
  wherein a plurality of data packages are associated with respective keys and are originally distributed among the nodes according to a first distribution configuration within the digital data storage system;
  wherein the storage system is adapted to redistribute the data packages, during a transition period, to conformity with a second distribution configuration within the storage system by migrating the data packages at respective migration times assigned to the data packages based on respective migration values associated with the data packages by
    applying a migration function to the respective keys of each of the data packages to determine, for each data package, a migration value associated with that data package, and
    assigning, to each of the plurality of data packages, a migration time within the transition period, based on its associated migration value, at which times the respective data packages are to be migrated within those of the plurality of nodes indicated by the second distribution configuration, to be in conformity with the second distribution configuration, so that,
  upon receiving a request for a particular data package
  the key of the requested data package is used to determine the migration time for the particular data package,
  the particular data package's migration time is used to determine which of the first or the second distribution configurations should be used to locate the particular data package, and
  the request is one of processed at a node receiving the request, or forwarded to another of the nodes, based on the determined distribution configuration and the location of the particular data package within the plurality of nodes.

* * * * *